United States Patent [19]

Grahac

[11] 4,192,343
[45] Mar. 11, 1980

[54] FULL-FLOW RELIEF VALVE

[75] Inventor: Mirko Grahač, Kamp-Lintfort, Fed. Rep. of Germany

[73] Assignee: WOMA-Apparatebau Wolfgang Maasberg & Co., GmbH, Duisburg, Fed. Rep. of Germany

[21] Appl. No.: 957,846

[22] Filed: Nov. 6, 1978

[30] Foreign Application Priority Data

Nov. 8, 1977 [DE] Fed. Rep. of Germany ....... 2749812

[51] Int. Cl.² ............................................. F16K 17/20
[52] U.S. Cl. ..................................... 137/474; 137/508; 137/512.3; 137/512.5
[58] Field of Search ............ 137/474, 472, 508, 512.3, 137/512.5

[56] References Cited

U.S. PATENT DOCUMENTS

| | | | |
|---|---|---|---|
| 2,050,853 | 8/1936 | Murphy | 137/508 X |
| 3,975,116 | 8/1976 | Feild | 137/508 X |
| 4,082,104 | 4/1978 | Keeney | 137/508 X |

*Primary Examiner*—Harold W. Weakley
*Attorney, Agent, or Firm*—Karl F. Ross

[57] ABSTRACT

The housing of a pressure-relief valve has an inlet port forming an inlet valve seat, an outlet port, a valve chamber between the ports, and an abutment in the valve chamber. A valve body in this chamber has an inlet end engageable in the inlet valve seat and an outlet end, and is displaceable in the housing between a closed position with its inlet end seated in and blocking the inlet valve seat and an open position engaging the abutment and with its inlet end spaced from the inlet valve seat. A pilot piston in the valve chamber has a throughgoing passage opening at one end at the outlet port and forming at its opposite end an outlet valve seat engageable with the outlet end of the valve body. This piston is itself displaceable in the housing between an open position with its outlet valve seat spaced from the outlet end of the valve body in either position thereof and a closed position with its outlet valve seat engaging and blocked by the outlet end. A spring urges this piston into the closed position. The effective area of the valve body is considerably smaller than that of the piston so that the pressure at which the valve opens is considerably higher than that at which it closes.

10 Claims, 3 Drawing Figures

FULL-FLOW RELIEF VALVE

FIELD OF THE INVENTION

The present invention relates to a threshold valve. More particularly this invention concerns a threshold valve of the full-flow type usable as a safety or relief valve.

BACKGROUND OF THE INVENTION

A threshold valve is a valve having an inlet port and an outlet port and normally blocking flow between these ports. Only when the pressure at the inlet port exceeds a predetermined maximum does such a valve open. Normally the valve is set up so that it closes again when the pressure at its inlet port drops below a predetermined minimum that is normally somewhat lower than the maximum pressure at which it opens originally. Most hydraulic and pneumatic systems are provided with this type of valve to prevent overpressurization of any component.

It is normally desired that such a valve be of a so-called full-flow type. Thus when open such a valve should present very little resistance to flow so that the overpressure condition can be remedied rapidly. Thus the maximum pressure at which the valve opens is normally quite a bit higher than the minimum pressure at which it again closes, and prior to dropping of the inlet pressure to this minimum pressure the valve should remain fully open.

OBJECTS OF THE INVENTION

It is therefore an object of the present invention to provide an improved threshold valve.

Another object is the provision of an improved full-flow relief valve which meets all of the above-given requirements.

Yet another object is to provide such a valve which can be produced at low cost, serviced easily, and adjusted, in accordance with individual requirements.

SUMMARY OF THE INVENTION

These objects are attained in accordance with the instant invention in a valve having a housing of the above-described type with an inlet port forming an inlet valve seat, an outlet port, a valve chamber between these ports, and an abutment in the valve chamber. A valve body is provided in this chamber and has an inlet end engageable in the inlet valve seat and an outlet end. This body is displaceable in the housing between a closed position with its inlet end seated in and blocking the inlet valve seat and an open position engaging the abutment and with its inlet end spaced from the inlet valve seat. A pilot piston is also provided in the valve according to this invention, in the valve chamber thereof. This pilot piston has a throughgoing passage opening at one end at the outlet port and forming at its opposite end an outlet valve seat engageable with the outlet end of the valve body. The piston is displaceable in the housing between an open position with its outlet valve seat spaced from the outlet end of the valve body in either position thereof and a closed position with its outlet valve seat engaging and blocked by the outlet end of the valve body. Biasing means such as a spring is provided in the housing urging this piston into the closed position. According to this invention the valve body has a predetermined relatively small effective area exposed at the inlet seat in the closed position of the valve body but the piston has a relatively large effective area exposed in the chamber. Thus so long as the piston and valve are both in the closed position the pressure at the inlet port will only be effective on the face of the valve body which is relatively small. Once this pressure is large enough to move the valve body and piston back against the force of the spring the pressure will be effective on the larger surface area of the piston, and will therefore cause it rapidly to move backwardly, with the valve body seating on the abutment and the valve snapping into the full-open position.

Thus the valve according to the instant invention can be set to open only at a very high pressure, yet will open very rapidly and will remain open until the pressure drops to a relatively low pressure. The ratio of surface areas of the piston and valve body determined the difference between the maximum and minimum pressures and the spring force determines the overall range in which this difference exists.

According to another feature of this invention the housing is made of three parts, an inlet part, and outlet part and an intermediate part. These parts are screwed onto one other. The intermediate part forms the abutment and acts as a guide both for the valve body and for the piston so that the assembly can be produced at low cost. The spring is braced between the outlet part and the piston. Thus it is possible by screwing the inlet part relative to the intermediate part to vary the stroke of the valve body, and similarly it is possible to vary the compression of the biasing spring by screwing the outlet part relative to the intermediate part. Furthermore it is a relatively simple matter to change springs or spring forces by partial disassembly of the valve according to this invention. In this manner servicing of the valve is a very simple matter, as is setting it up for any of various possible operating characteristics.

SPECIFIC DESCRIPTION

Figure 1:
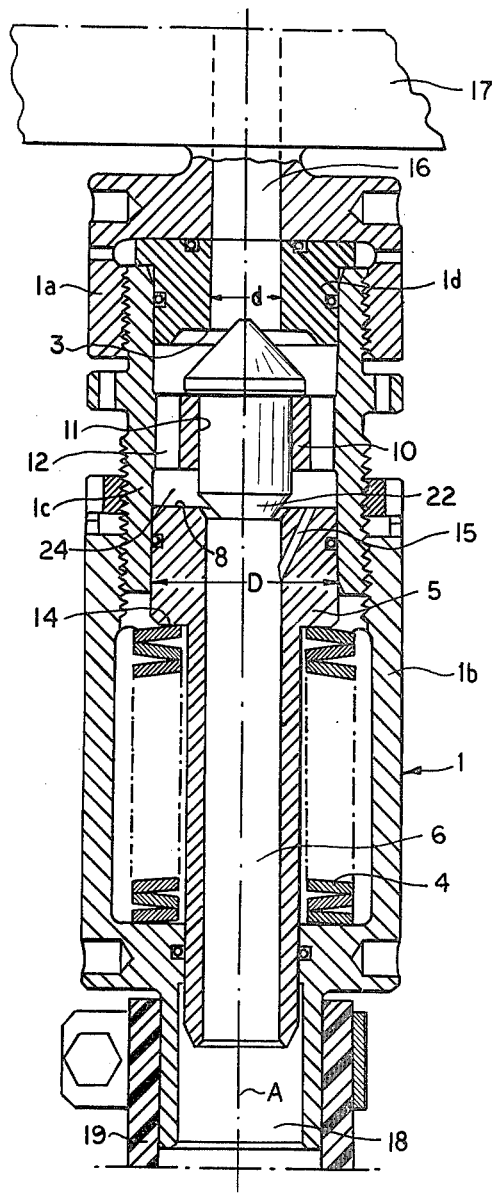
FIG. 1 is an axial section through the valve according to this invention in fully open condition.
Figure 2:
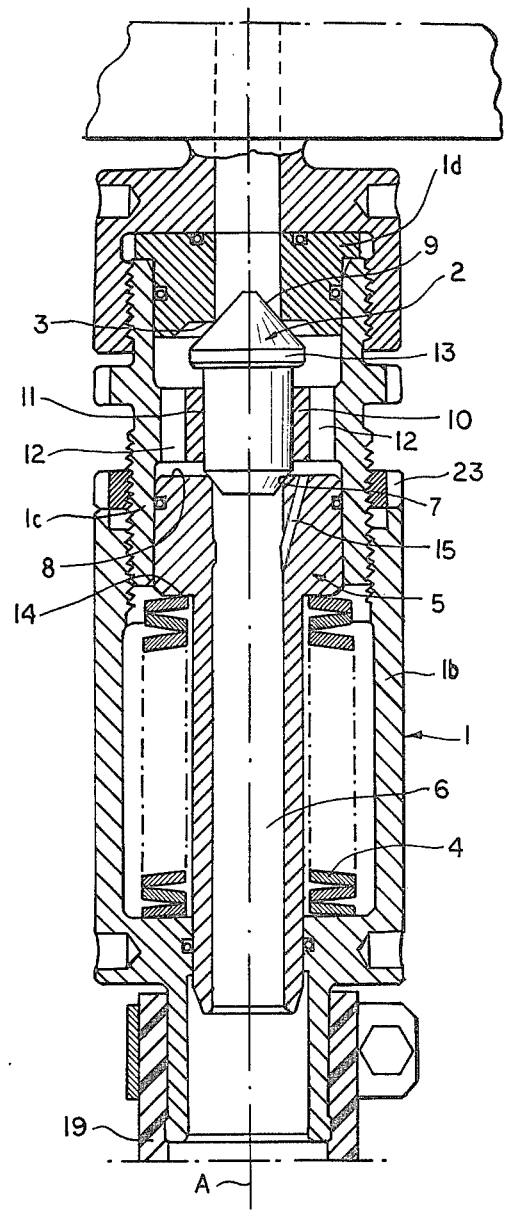
FIG. 2 is a similar section through the valve according to this invention in the fully closed position.
Figure 3:
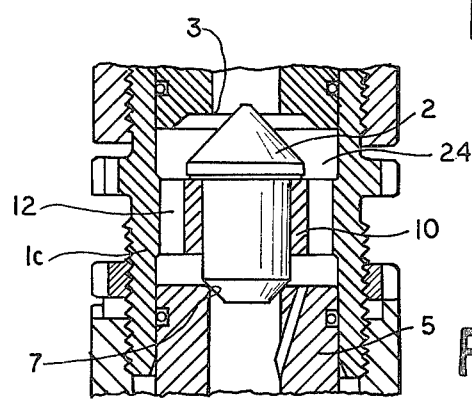
FIG. 3 is a detail view of the valve according to this invention in an intermediate position between the open and closed positions.

As shown in the drawing a valve according to the instant invention basically has a housing 1 centered on an axis A and formed with an inlet port 16 here opening into a pressure vessel 17 and an outlet port 18 connected to a vent hose 19. A valve body 2 in a chamber 24 of the housing 1 has a frustoconical and axially centered head 9 fittable in a valve seat 3 having a diameter d. This valve body 2 has a short stem 20 provided in an axially centered cylindrical hole 11 formed in a collar or shoulder 10 constituting an abutment in the housing 1 and formed with a plurality of axially throughgoing holes 12 whose aggregate flow cross section is at least equal to that of the inlet port 16. This valve body 2 is displaceable between the open position shown in FIGS. 1 and 3 with the shoulder 13 at the back of its head 9 resting on the abutment 10, and the closed position shown in FIG. 2 with its head 9 fitting tightly within the seat 3 and blocking same.

In addition the housing 1 contains a pilot piston 5 of T-shape and centered on the axis A. This piston 5 has an upper end face 8 of a diameter D here equal to somewhat more than twice the diameter d. In addition the piston 5 is formed with a cylindrical axially centered throughgoing passage 6 that opens at the face 8 and at the outlet port 18. The upper end of the passage 6 is formed with a frustoconical seat 7 in which is snugly engageable a complementarily frustoconical tapered lower or rear end 22 at the valve body 2. A small-diameter passage 15 extending at an angle to the axis A extends between the interior of the passage 6 and the surface 8 offset from the seat 7. A spring 4 constituted as a stack of Belleville washers is placed between the housing 1 and the shoulder 14 of the piston 5 and urges it into the upper or closed position shown in FIGS. 2 and 3, with the rear end 22 snugly engaged in the seat 7 and blocking same.

The housing 1 is formed by an upper inlet part 1a, a lower outlet part 1b, and an intermediate part 1c. The parts are joined together by screw threads and are generally centered on the axis A. The piston 5 and the valve body 2 are both guided in the intermediate part 1c which, therefore, is the only one of the three housing parts that need be carefully machined, so that production costs can be kept to a minimum. The inner part 1a and intermediate part 1c can be screwed axially relative to each other to adjust the stroke of the valve body 2, although normally the stroke is determined by the thickness of a replaceable insert 1d. Screwing of the intermediate parts 1c and outlet part 1b does adjust the compression of the spring 4. The extent of spring compression determines the pressure at which the valve opens, so that a suitable scale can be provided between the parts 1b and 1c to indicate what pressure the valve will open at. In addition a lock nut 23 is provided to lock the two parts 1b and 1c relative to each other to prevent misadjustment.

In use the outlet port 18 is normally at ambient pressure and the inlet port 16 is connected to the component to be protected against excessive pressure. So long as the pressure at the inlet post 16 lies below a predetermined maximum pressure it will exert insufficient axial force of the effective surface of the head 9 of the body 2 exposed in the port 16 to compress the spring 4 and force the body 2 and the piston 5 down. When, however, the pressure is sufficient to push the body 2 and the piston 5 in force-transmitting contact therewith down against this force of the spring 4 into the position shown in FIG. 3 the fluid will be able to move past the inlet port into the valve chamber 24.

Pressurization of the valve chamber 24, which includes the small compartments to both sides of the partition 10 as well as the passages 12 therethrough, will bring this pressurized fluid to bear on the much larger surface of the piston 5. Due to the much larger surface area of this end face 8 the pressure will easily be able to overcome the force of the spring 4 to push the piston 5 further down inside the housing 1 from the position shown in FIG. 3 to the position shown in FIG. 1. This leaves the valve body 2 resting on the abutment 10 and provides a clear passage for fluid flow through the valve.

Only when the pressure effective on the piston 8 is insufficient to overcome the force of the spring 4 will the valve again close, which action will normally be relatively rapid. Once closed it will be necessary for the pressure to build up again to the maximum pressure which is considerably higher than the minimum closing pressure in order for it to open again. In any case the opening will be extremely rapid and will create an enormous pressure differential for quick bleeding-off of the pressure inside the vessel 17. Prior to opening up the valve very little flow through it is possible, and once closed the considerable force of the springs 4 will normally prevent any leakage whatsoever.

The bleeder passage 15 prevents fluid trapped in the chamber 24 from preventing the valve from closing, and slightly damps the action of the valve to prevent excessive mechanical fatigue.

I claim:

1. A valve comprising:
    a housing having an inlet port forming an inlet valve seat, an outlet port, a valve chamber between said ports, and an abutment in said chamber;
    a valve body in said chamber having an inlet end engageable in said inlet valve seat and an outlet end, said body being displaceable in said housing between a closed position with its said inlet end seated in and blocking said inlet valve seat and an open position engaging said abutment and with its said inlet end spaced from said inlet valve seat;
    a pilot piston in said chamber having a throughgoing passage opening at one end at said outlet port and forming at its opposite end an outlet valve seat engageable with said outlet end of said valve body, said piston being displaceable in said housing between an open position with its said outlet valve seat spaced from said outlet end of said valve body in either position thereof and a closed position with its said outlet valve seat engaging and blocked by said outlet end; and
    biasing means in said housing urging said piston into said closed position.

2. The valve defined in claim 1 wherein said biasing means includes at least one spring.

3. The valve defined in claim 1 wherein said valve body has a predetermined relatively small effective area exposed at said inlet seat in said closed position of said body and said piston has a relatively large effective area exposed in said chamber.

4. The valve defined in claim 3 wherein said large surface area is at least twice as great as said small surface area.

5. The valve defined in claim 3 wherein said housing has an inlet part having said inlet port, an outlet part having said outlet port, and an intermediate port having said abutment and threaded into said inlet and outlet parts, said biasing means being at least one spring braced between said piston and said outlet part, whereby screwing of said intermediate part relative to said inlet part varies the stroke of said valve body between its said open and closed positions and screwing of said intermediate part relative to said outlet part varies the compression of said spring.

6. The valve defined in claim 5 wherein said intermediate part is formed with a guide for said valve body and for said piston.

7. The valve defined in claim 3 wherein said housing is formed with a bleed passage of substantially smaller flow cross section than said passage of said pilot piston and opening at one end into said chamber and at its opposite end into said passage of said pilot piston.

8. The valve defined in claim 3 wherein said body has a tapered head forming said small surface area.

9. The valve defined in claim 3 wherein said housing is formed with a partition constituting said abutment and formed with a guide for said body, said partition having throughgoing holes for flow therethrough of a fluid.

10. The valve defined in claim 3 wherein the strokes of said body and of said piston between their respective open and closed positions are of generally the same length.

* * * * *